(12) United States Patent
Oi et al.

(10) Patent No.: US 9,991,789 B2
(45) Date of Patent: Jun. 5, 2018

(54) ELECTRIC MOTOR VEHICLE

(71) Applicant: TOYOTA JIDOSHA KABUSHIKI KAISHA, Toyota-shi, Aichi-ken (JP)

(72) Inventors: Shohei Oi, Toyota (JP); Ryoji Sato, Toyohashi (JP); Tomoko Oba, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 420 days.

(21) Appl. No.: 14/708,389

(22) Filed: May 11, 2015

(65) Prior Publication Data

US 2015/0321574 A1 Nov. 12, 2015

(30) Foreign Application Priority Data

May 12, 2014 (JP) ................................ 2014-098464

(51) Int. Cl.
*B60L 15/20* (2006.01)
*H02M 3/04* (2006.01)
*B60L 3/00* (2006.01)
*B60L 3/04* (2006.01)
*B60L 3/12* (2006.01)

(52) U.S. Cl.
CPC ............. *H02M 3/04* (2013.01); *B60L 3/0007* (2013.01); *B60L 3/04* (2013.01); *B60L 3/12* (2013.01); *B60L 2210/12* (2013.01); *B60L 2210/14* (2013.01); *B60L 2240/421* (2013.01); *B60L 2240/527* (2013.01); *Y02T 10/642* (2013.01); *Y02T 10/7225* (2013.01); *Y02T 10/7233* (2013.01); *Y02T 10/7258* (2013.01)

(58) Field of Classification Search
CPC ............ B60L 11/18; B60L 15/20; H02M 3/04
USPC ..................................................... 307/9.1, 10.1
See application file for complete search history.

(56) References Cited

U.S. PATENT DOCUMENTS

| 6,169,336 | B1 * | 1/2001 | Hayashi | ................ | B60R 21/017 |
| | | | | | 280/735 |
| 8,612,073 | B2 * | 12/2013 | Fuji | ........................... | B60L 3/00 |
| | | | | | 307/10.1 |
| 2005/0029869 | A1 * | 2/2005 | Teran, Jr. | .............. | F02D 41/042 |
| | | | | | 307/10.1 |
| 2006/0076833 | A1 * | 4/2006 | Kojima | ................. | B60L 3/0007 |
| | | | | | 307/10.1 |

(Continued)

FOREIGN PATENT DOCUMENTS

| JP | 2010-178595 | 8/2010 |
| JP | 2011-10406 | 1/2011 |

(Continued)

*Primary Examiner* — Daniel Kessie
(74) *Attorney, Agent, or Firm* — Finnegan, Henderson, Farabow, Garrett & Dunner, LLP

(57) ABSTRACT

The electric motor vehicle includes a voltage conversion circuit, a primary-side smoothing capacitor, a battery, a system main relay, an inverter circuit, a secondary-side smoothing capacitor, an electric motor, a first voltage sensor, a collision sensor, and a controller. The controller is configured to adjust an operation of the voltage conversion circuit, detect primary-side voltage by using the first voltage sensor in a state that the voltage conversion circuit is operated in a case where a collision is detected by the collision sensor, and detect a state that the system main relay is off based on a change in the detected primary-side voltage.

8 Claims, 10 Drawing Sheets

(56) References Cited

U.S. PATENT DOCUMENTS

| | | | | |
|---|---|---|---|---|
| 2009/0115351 A1* | 5/2009 | Heap | ................ | B60K 6/445 |
| | | | | 307/10.1 |
| 2009/0273235 A1* | 11/2009 | Ichikawa | ............ | B60L 11/1851 |
| | | | | 307/9.1 |
| 2010/0045104 A1* | 2/2010 | Hirasawa | ............... | B60K 6/445 |
| | | | | 307/9.1 |
| 2012/0039100 A1* | 2/2012 | Hirose | ................ | B60K 6/445 |
| | | | | 363/50 |

FOREIGN PATENT DOCUMENTS

| JP | 2011-087444 A | 4/2011 |
|---|---|---|
| JP | 2013-123941 A | 6/2013 |
| JP | 2013-132129 A | 7/2013 |
| JP | 2013-236442 | 11/2013 |

* cited by examiner

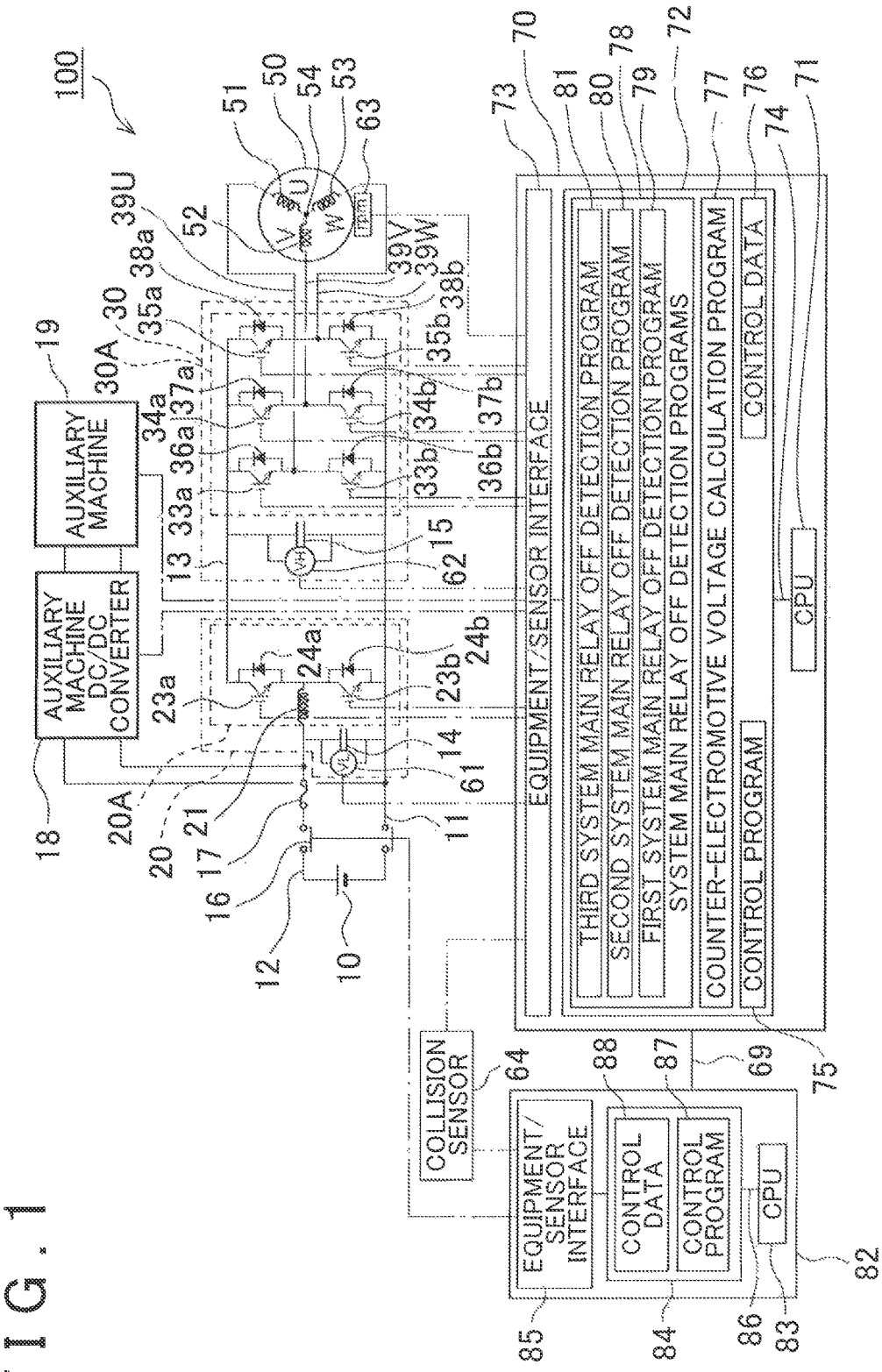

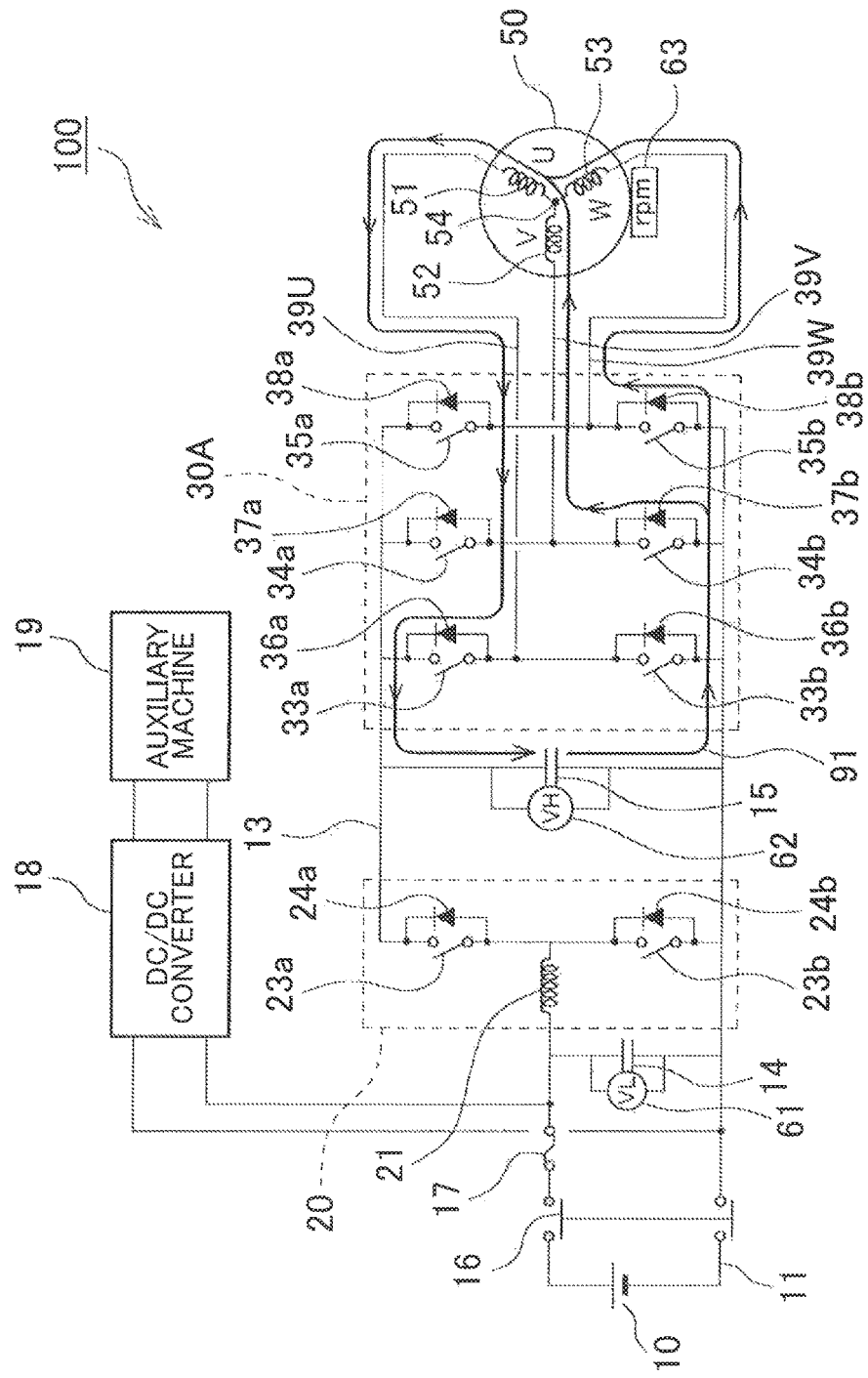

ELECTRIC MOTOR VEHICLE

INCORPORATION BY REFERENCE

The disclosure of Japanese Patent Application No. 2014-098464 filed on May 12, 2014 including the specification, drawings and abstract is incorporated herein by reference in its entirety.

BACKGROUND OF THE INVENTION

1. Field of the Invention

The invention relates to an electric motor vehicle, and in particular to an electric motor vehicle that detects an off state of a system main relay during a collision.

2. Description of Related Art

In recent years, electric motor vehicles, such as electric vehicles and hybrid vehicles, have widely been used. A method for driving a motor by stepping up voltage of DC power of a battery by a step-up converter and then converting the DC power to AC power for driving the motor by an inverter has widely been used in the electric motor vehicles. In order to stabilize the supplied DC power, a high-capacity smoothing capacitor is used for the step-up converter, the inverter, and the like. While the step-up converter and the inverter are in operation, electric charges that correspond to applied voltage are accumulated in this smoothing capacitor.

In such a case that the electric motor vehicle collides, the electric charges accumulated in the smoothing capacitor need to be immediately discharged. As a method for this, a method has been suggested in which, after a system main relay is turned off to cut off a connection between the battery and the smoothing capacitor, voltage of the smoothing capacitor is stepped up by a DC/DC converter and supplied to an auxiliary machine drive circuit, and the electric charges of the smoothing capacitor are discharged by driving an auxiliary machine when the electric motor vehicle collides (for example, see Japanese Patent Application. Publication No. 2011-10406 (JP 2011-10406 A) and Japanese Patent Application Publication No. 2010-178595 (JP 2010-178595 A)).

SUMMARY OF THE INVENTION

In related art described in JP 2011-10406 A and JP 2010-178595 A, in the case where the electric charges of the smoothing capacitor are discharged by the auxiliary machine drive circuit, a state that the system main relay is turned off and the connection between the battery and the smoothing capacitor is cut off is necessary. For this reason, when the electric motor vehicle collides, a signal for turning off the system main relay is output from an ECU. However, a preferred technique for confirming that the system main relay is turned off is not suggested.

The invention provides an electric motor vehicle that detects an off state of a system main relay by using means that differs from a signal for turning off the system main relay.

An electric motor vehicle according to one aspect of the invention includes a voltage conversion circuit, a primary-side smoothing capacitor, a battery, a system main relay, a secondary-side smoothing capacitor, an inverter circuit, an electric motor, a first voltage sensor, a collision sensor, and a controller. The primary-side smoothing capacitor is connected to a primary side of the voltage conversion circuit. The battery is connected in parallel to the primary-side smoothing capacitor on the primary side of the voltage conversion circuit. The system main relay is connected between the primary-side smoothing capacitor and the battery. The secondary-side smoothing capacitor is connected to a secondary side of the voltage conversion circuit. The inverter circuit is connected in parallel to the secondary-side smoothing capacitor on the secondary side of the voltage conversion circuit. The electric motor is connected to the inverter circuit. The first voltage sensor is configured to detect primary-side voltage of the voltage conversion circuit. The collision sensor is configured to detect a collision of the electric motor vehicle. The controller is configured to adjust an operation of the voltage conversion circuit, detect the primary-side voltage by using the first voltage sensor in a state that the voltage conversion circuit is operated in the case where the collision is detected by the collision sensor, and detect a state that the system main relay is off based on a change in the detected primary-side voltage.

The electric motor vehicle according to the above aspect may further include a second voltage sensor for detecting secondary-side voltage of the voltage conversion circuit and a rotational speed sensor for detecting a rotational speed of the electric motor. The voltage conversion circuit may be configured to output a step up voltage of the primary-side voltage from the secondary side and output a step down voltage of the secondary-side voltage from the primary side. The controller may be configured to calculate counter-electromotive voltage of the electric motor on the basis of the rotational speed of the electric motor that is detected by the rotational speed sensor, detect the primary-side voltage by using the first voltage sensor in a state that the voltage conversion circuit outputs the step up voltage in the case where the secondary-side voltage detected by the second voltage sensor is higher than the counter-electromotive voltage of the electric motor, and detect a state that the system main relay is off based on a decrease of the detected primary-side voltage.

The electric motor vehicle according to the above aspect may further include a second voltage sensor for detecting secondary-side voltage of the voltage conversion circuit and a rotational speed sensor for detecting a rotational speed of the electric motor. The voltage conversion circuit may be configured to output a step up voltage of the primary-side voltage from the secondary side and output a step down voltage of the secondary-side voltage from the primary side. The controller may be configured to calculate counter-electromotive voltage of the electric motor on the basis of the rotational speed of the electric motor that is detected by the rotational speed sensor, detect the primary-side voltage by using the first voltage sensor in a state that the voltage conversion circuit outputs the step down voltage in the case where the secondary-side voltage detected by the second voltage sensor is higher than the counter-electromotive voltage of the electric motor, and detect a state that the system main relay is off based on an increase of the detected primary-side voltage.

The electric motor vehicle according to the above aspect may further include a second voltage sensor for detecting secondary-side voltage of the voltage conversion circuit and a rotational speed sensor for detecting a rotational speed of the electric motor. The voltage conversion circuit may be configured to output a step up voltage of the primary-side voltage from the secondary side and output a step down voltage of the secondary-side voltage from the primary side. The controller may be configured to calculate counter-electromotive voltage of the electric motor on the basis of the rotational speed of the electric motor that is detected by the rotational speed sensor, detect the primary-side voltage by using the first voltage sensor in a state that the voltage conversion circuit outputs the step up voltage in the case were the secondary-side voltage detected by the second voltage sensor is equal to or lower than the counter-electromotive voltage of the electric motor, and detect a state that the system main relay is off based on a decrease of the detected primary-side voltage.

The invention provides the electric motor vehicle that detects an off state of the system main relay by using means that differs from a signal for turning off the system main relay.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a system diagram of a control system of an electric motor vehicle in an embodiment of the invention;

FIG. 3 is an explanatory view of a current flow immediately after a collision of the electric motor vehicle;

DETAILED DESCRIPTION OF EMBODIMENTS

Figure 2A:
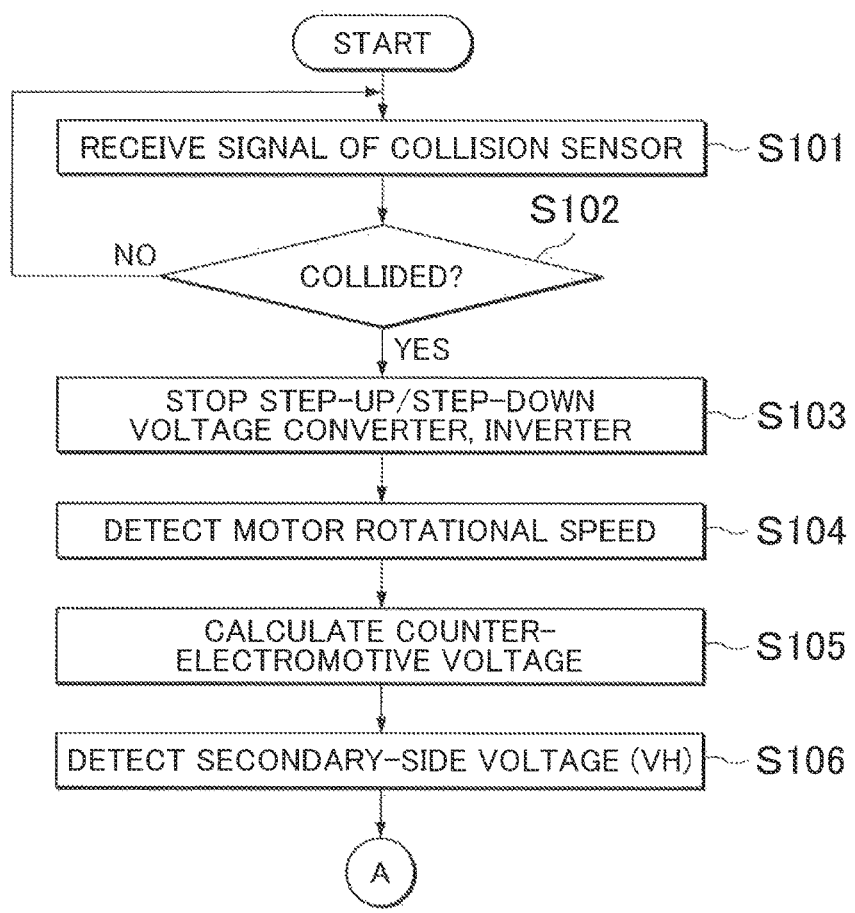
FIG. 2A and FIG. 2B are flowcharts of an operation for detecting an off state of a system main relay in a control section that is mounted in the electric motor vehicle in the embodiment of the invention.

A description will hereinafter be made on an embodiment of the invention with reference to the drawings. As shown in FIG. 1, an electric motor vehicle 100 of this embodiment includes a battery 10, a voltage step-up/step-down converter 20, an inverter 30, a motor 50 as an electric motor for driving the vehicle, a system main relay 16 and a fuse 17 that are connected between the battery 10 and the voltage step-up/step-down converter 20, an auxiliary machine DC/DC converter 18 that steps down voltage of DC power supplied from the battery 10 and supplies the DC power to an auxiliary machine 19, and a controller 70 that adjusts operations of the voltage step-up/step-down converter 20, the inverter 30, the auxiliary machine DC/DC converter 18, and the auxiliary machine 19. The electric motor vehicle 100 further includes a collision sensor 64 that detects a collision of the electric motor vehicle 100 and an ECU 82 that turns on/off the system main relay 16 and controls the entire electric motor vehicle 100. Noted that a chain line represents a signal line in FIG. 1.

The voltage step-up/step-down converter 20 contains: a negative-side electrical path 11 that is shared with the inverter 30 connected to a negative side of the battery 10; a low-voltage electrical path 12 that is connected to a positive side of the battery 10; and a high-voltage electrical path 13 that is a positive-side output end of the voltage step-up/step-down converter 20 and a positive-side input end of the inverter 30. The negative-side electrical path 11 and the low-voltage electrical path 12 constitute a primary-side electrical path of the voltage step-up/step-down converter 20. The negative-side electrical path 11 and the high-voltage electrical path 13 constitute a secondary-side electrical path of the voltage step-up/step-down converter 20 and a primary-side electrical path of the inverter 30.

The voltage step-up/step-down converter 20 contains: an upper arm switching element 23a that is connected between the low-voltage electrical path 12 and the high-voltage electrical path 13; a lower-arm switching element 23b that is connected between the negative-side electrical path 11 and the low-voltage electrical path 12; a reactor 21 that is connected in series to the low-voltage electrical path 12; a primary-side smoothing capacitor 14 that is connected between the low-voltage electrical path 12 and the negative-side electrical path 11; and a low-voltage sensor 61 that detects low voltage VL at both ends of the primary-side smoothing capacitor 14. In addition, diodes 24a, 24b are respectively connected in reverse parallel to the switching elements 23a, 23b. The voltage step-up/step-down converter 20 turns on the lower-arm switching element 23b and accumulates electrical energy from the battery 10 in the reactor 21 in a state that the upper arm switching element 23a is turned off. Then, the voltage step-up/step-down converter 20 turns off the lower-arm switching element 23b, steps up the voltage by using the electrical energy accumulated in the reactor 21, and outputs the stepped-up voltage to the high-voltage electrical path 13. In addition, the voltage step-up/step-down converter 20 turns on the upper arm switching element 23a, steps down the voltage of the inverter 30, and accumulates the stepped-down voltage as the electrical energy in the reactor 21 in a state that the lower arm switching element 23b is turned off. Then, the voltage step-up/step-down converter 20 turns off the upper arm swathing element 23a and charges the battery 10 with the electrical energy accumulated in the reactor 21.

Each of the switching elements 23a, 23b in the voltage step-up/step-down converter 20, each of the diodes 24a, 24b, and the reactor 21 constitute a voltage step-up/step-down circuit 20A as a voltage conversion circuit. The negative-side electrical path 11 and the low-voltage electrical path 12 constitute a primary-side electrical path of the voltage step-up/step-down circuit 20A, and the negative-side electrical path 11 and the high-voltage electrical path 13 constitute a secondary-side electrical path of the voltage step-up/step-down circuit 20A. Accordingly, the low voltage VL at both of the ends of the primary-side smoothing capacitor 14 becomes primary-side voltage of the voltage step-up/step-down circuit 20A, and the low-voltage sensor 61 that detects the low voltage VL at both of the ends of the primary-side smoothing capacitor 14 serves as a first voltage sensor that detects the primary-side voltage of the voltage step-up/step-down circuit 20A.

The inverter 30 includes six switching elements (33a, 33b (a U-phase)), (34a, 34b (a V-phase), (35a, 35b (a W-phase)), two each of which are connected in series with respect to each of U, V, and W phases between the high-voltage electrical path 13 and the negative-side electrical path 11. Upper-side switching elements shown in FIG. 1 are upper arm switching elements 33a, 34a, 35a, and lower-side switching elements are lower arm switching elements 33b, 34b, 35b. Output lines 39U, 39V, 39W of the U, V, and W phases are respectively connected between each of the upper arm switching elements 33a, 34a, 35a and each of the lower arm switching elements 33b, 34b, 35b. The output lines 39U, 39V, 39W of the U, V, and W phases are respectively connected to one ends of U, V, W-phase coils 51, 52, 53. Another end of each of the phase coils 51, 52, 53 is connected to a neutral point 54. In addition, diodes 36a to 38a, 36b to 38b are respectively connected in reverse parallel to the upper arm switching elements 33a to 35a and the lower arm switching elements 33b to 35b of the U, V, and W phases. The inverter 30 turns on/off the six switching elements that are the upper arm switching elements 33a to 35a and the lower arm switching elements 33b to 35b, converts the step-up DC power supplied from the voltage step-up/step-down converter 20 to AC power, and supplies the AC power to the motor 50 for driving the vehicle. In addition, the inverter 30 converts the AC power generated by the motor 50 to the DC power and charges the battery 10 with the DC power via the voltage step-up/step-down converter 20. Each of the switching elements 33a to 35a, 33b to 35b and each of the diodes 36a to 38a, 36b to 38b of the inverter 30 as well as each of the output lines 39U, 39V, 39W of the U, V, and W phases constitute an inverter circuit 30A. In addition, the negative-side electrical path 11 and the high-voltage electrical path 13 constitute a primary-side electrical path of the inverter circuit 30A.

Furthermore, the inverter 30 includes a secondary-side smoothing capacitor 15 that is connected between the high-voltage electrical path 13 and the negative-side electrical path 11 of the primary-side electrical path of the inverter circuit 30A (the secondary-side electrical path of the voltage step-up/step-down circuit 20A). A high-voltage sensor 62 that detects high voltage VU at both ends is attached to the secondary-side smoothing capacitor 15. The high voltage VH at both of the ends of the secondary-side smoothing capacitor 15 becomes primary-side voltage of the inverter circuit 30A and secondary-side voltage of the voltage step-up/step-down circuit 20A, Thus, the high-voltage sensor 62 that detects the high voltage VH at both of the ends of the secondary-side smoothing capacitor 15 serves as a second voltage sensor that detects the secondary-side voltage of the voltage step-up/step-down circuit 20A. Moreover, a rotational speed sensor 63 that detects a rotational speed of a rotor is attached to the motor 50.

Each of the switching elements 23a, 23b of the voltage step-up/step-down converter 20 and each of the switching elements 33a to 35a, 33b to 35b of the inverter 30 are power semiconductor switching elements, such as insulated gate bipolar transistors (IGBT), power metal oxide semiconductor (MOS) transistors, or power bipolar transistors. The battery 10 is a chargeable and dischargeable secondary battery, such as a lithium ion secondary battery or a nickel hydrogen battery, addition, the collision sensor 64 that detects the collision of the electric motor vehicle 100 determines whether the electric motor vehicle 100 has collided by using an acceleration sensor (a G sensor), for example.

The controller 70 is a computer that includes a CPU 71 for performing computation and information processing, a storage section 72, and an equipment/sensor interface 73 for connecting each equipment and each sensor therein and in which the CPU 71, the storage section 72, and the equipment/sensor interface 73 are connected by a data bus 74. A control program 75 for controlling the operations of the voltage step-up/step-down converter 20, the inverter 30, and the like, control data 76, a counter-electromotive voltage calculation program 77, which will be described below, and a system main relay off detection program 78 are stored in the storage section 72. In addition, the system main relay off detection program 78 contains first, second, and third system main relay off detection programs 79, 80, 81 therein. Each of the switching elements 23a, 23b of the voltage step-up/step-down converter 20, each of the switching elements 33a to 35a, 33b to 35b of the inverter 30, the auxiliary machine DC/DC converter 18, and the auxiliary machine 19 are connected to the controller 70 via the equipment/sensor interface 73 and operated by a command of the controller 70. In addition, the low-voltage sensor 61, the high-voltage sensor 62, the rotational speed sensor 63, and the collision sensor 64 are connected to the controller 70 via the equipment/sensor interface 73, and a signal of each of the sensors 61, 62, 63, 64 is input to the controller 70.

Similar to the controller 70, the ECU 82 is a computer that includes a CPU 83 for performing the computation and the information processing, a storage section 84, and an equipment/sensor interface 85 for connecting each of the equipment and each of the sensors therein and in which the CPU 83, the storage section 84, and the equipment/sensor interface 85 are connected by a data bus 86. A control program 87 for controlling the entire electric motor vehicle 100 and control data 88 are stored in the storage section 84. The system main relay 16 is connected to the ECU 82 via the equipment/sensor interface 85 and performs an on/off operation by a command of the ECU 82. In addition, the collision sensor 64 is also connected to the ECU 82 via the equipment/sensor interface 85, and a detected signal is input to the ECU 82. The ECU 82 and the controller 70 are connected to each other by a data bus 69, and a signal that causes the ECU 82 to turn on/off the system main relay 16 is input to the controller 70 via the data bus 69.

A description will be made on the operation of the controller 70 during the collision of the electric motor vehicle 100, which is configured as described above, with reference to FIG. 2A to FIG. 9. Noted that each of the switching elements 23a, 23b, 33a to 35a, 333 to 35b of the voltage step-up/step-down converter 20 and the inverter 30 is shown briefly as a simple on/off switch in FIG. 3 to FIG. 9.

Before the collision, the electric motor vehicle 100 is traveling, the voltage step-up/step-down converter 20, the inverter 30, the motor 50, and the auxiliary machine 19 are each operated in accordance with a normal control program, and electric charges that correspond to the low voltage VL and electric charges that correspond to the high voltage VH are respectively accumulated in the primary-side smoothing capacitor 14 and the secondary-side smoothing capacitor 15. The controller 70 receives a signal of the collision sensor 64 via the equipment/sensor interface 73 as shown in step S101 in FIG. 2A, and determines whether the electric motor vehicle 100 has collided as shown in step S102 in FIG. 2A. For example, it may be determined that the electric motor vehicle 100 has collided in the case where an acceleration rate detected by the collision sensor 64 is equal to or higher than a specified threshold. If the controller 70 determines in step S102 in FIG. 2A that the electric motor vehicle 100 has not collided, the process returns to step S101 in FIG. 2A. Then, the controller 70 receives the signal of the collision sensor 64 and continues monitoring the collision of the electric motor vehicle 100.

If the controller 70 determines in step S102 in FIG. 2A that the electric motor vehicle 100 has collided, as shown in step S103 in FIG. 2A, the controller 70 outputs a command to turn off all of the switching elements 23a, 23b of the voltage step-up/step-down converter 20 and the switching elements 33a to 35a, 33b to 35b of the inverter 30. Then, as shown in FIG. 3, the controller 70 turns off all of the switching elements 23a, 23b of the voltage step-up/step-down converter 20 and the switching elements 33a to 35a, 33b to 35b of the inverter 30, and stops the operations of the voltage step-up/step-down converter 20 and the inverter 30.

In addition, the ECU 82 that is shown in FIG. 1 also receives the signal of the collision sensor 64 via the equipment/sensor interface 85 and monitors the collision of the electric motor vehicle 100 in the similar manner as the controller 70. Then, in the case where an acceleration signal received from the collision sensor 64 exceeds the specified threshold, for example, the ECU 82 determines that the electric motor vehicle 100 has collided and outputs a signal for turning of the system main relay 16. This signal is also input to the controller 70 via the data bus 69.

Wheels of the electric motor vehicle 100 keep rotating immediately after the collision. This causes the motor 50 to rotate, and a counter-electromotive force of the motor 50 is generated by the rotation of the motor 50. In the case where the high voltage VH during the collision is equal to or lower than counter-electromotive voltage by the counter-electromotive force of the motor 50 (the high voltage VH≤the counter-electromotive voltage), as indicated by an arrow 91 shown in FIG. 3, a current sequentially flows through the U-phase coil 51 of the motor 50, the U-phase output line 39U, the diode 36a, the high-voltage electrical path 13, the secondary-side smoothing capacitor 15, the negative-side electrical path 11, the diodes 37b, 38b, the V, W-phase output lines 39V, 39W, the V, W-phase coils 52, 53, the neutral point 54, and the U-phase coil 51 by this counter-electromotive force. The high voltage VH at both of the ends of the secondary-side smoothing capacitor 15 is increased to be equal to the counter-electromotive voltage of the motor 50. On the contrary, in the case where the high voltage VH during the collision is higher than the counter-electromotive voltage of the motor 50, the current as described above does not flow, and the high voltage VH remains at the voltage during the collision. Since the switching elements 23a, 23b of the voltage step-up/step-down converter 20 are turned off and the connection between the voltage step-up/step-down circuit 20A and the inverter 30 is cut off, the low voltage VL at both of the ends of the primary-side smoothing capacitor 14, which is the primary-side voltage of the voltage step-up/step-down circuit 20A, remains at the same voltage as the voltage of the battery 10 like the low voltage VL immediately before the collision. Noted that, a way the current flows in the case where the high voltage VH during the collision is equal to or lower than the counter-electromotive voltage of the motor 50 (the high voltage VH≤the counter-electromotive voltage) is not limited to that indicated by the arrow 91 in FIG. 3. For example, there is a case where currents flow in a circuit such that a U-phase current flows from the inverter 30 toward the motor 50 and V-phase, W-phase currents flow from the motor 50 toward the inverter 30.

If it is determined in step S102 in FIG. 2A that the electric motor vehicle 100 has collided, the CPU 71 of the controller 70 stops the voltage step-up/step-down converter 20 and the inverter 30 in step S103 in FIG. 2A regardless of whether the signal for turning off the system main relay 16 is received from the ECU 82. Then, the process proceeds to step S104 in FIG. 2A, and the CPU 71 of the controller 70 executes the counter-electromotive voltage calculation program 77 shown in FIG. 1 (counter-electromotive voltage calculation means). As shown in step S104 in FIG. 2A, the controller 70 obtains the rotational speed of the motor 50 from the rotational speed sensor 63 shown in FIG. 1. Then, as shown in step S105 in FIG. 2A, the CPU 71 of the controller 70 calculates the counter-electromotive voltage of the motor 50 from the detected rotational speed of the motor 50 by using the following (Equation 1).

The counter-electromotive voltage ($V$) of the motor 50=the rotational speed $\omega$ of the motor 50×coefficient $\varphi$ of the counter-electromotive voltage  (Equation 1)

Figure 2B:
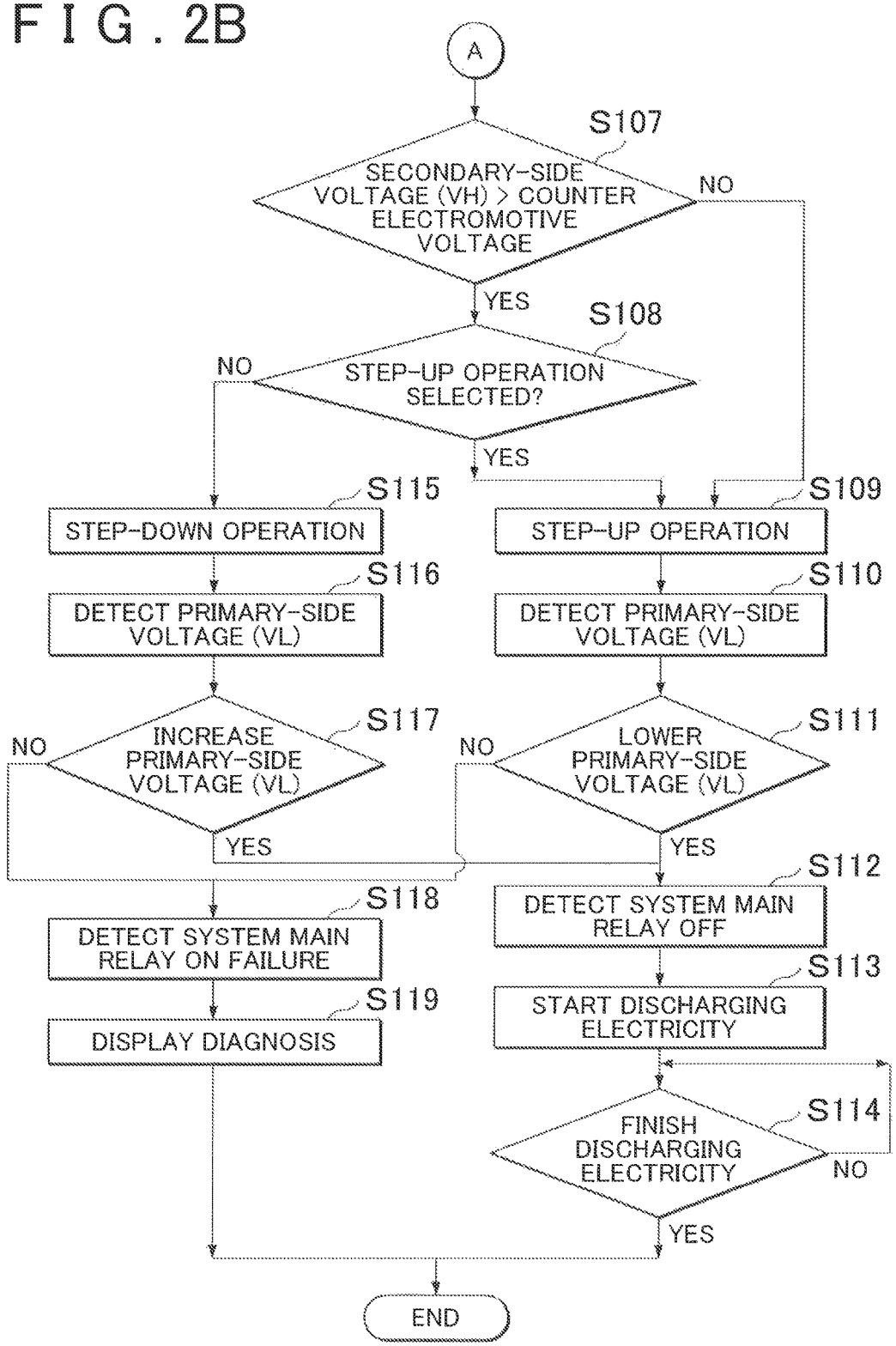

In addition, as shown in step S106 in FIG. 2A, the controller 70 detects the high voltage VH, which is the secondary-side voltage of the voltage step-up/step-down circuit 20A, by the high-voltage sensor 62 shown in FIG. 1. Then, as shown in step S107 in FIG. 2B, the CPU 71 of the controller 70 compares the high voltage VH, which is the secondary-side voltage of the voltage step-up/step-down circuit 20A, with the counter-electromotive voltage of the motor 50. If the high voltage VU, which is the secondary-side voltage of the voltage step-up/step-down circuit 20A, is not higher than the counter-electromotive voltage of the motor 50 (is equal to or lower than the counter-electromotive voltage of the motor 50, that is, if the high voltage VH≤the counter-electromotive voltage and a determination in step S107 in FIG. 2B is "NO"), the process proceeds to step S109 in FIG. 2B. Then, the CPU 71 of the controller 70 executes the third system main relay off detection program 81 shown in FIG. 1 and performs a voltage step-up operation of the voltage step-up/step-down circuit 20A.

Figure 4:
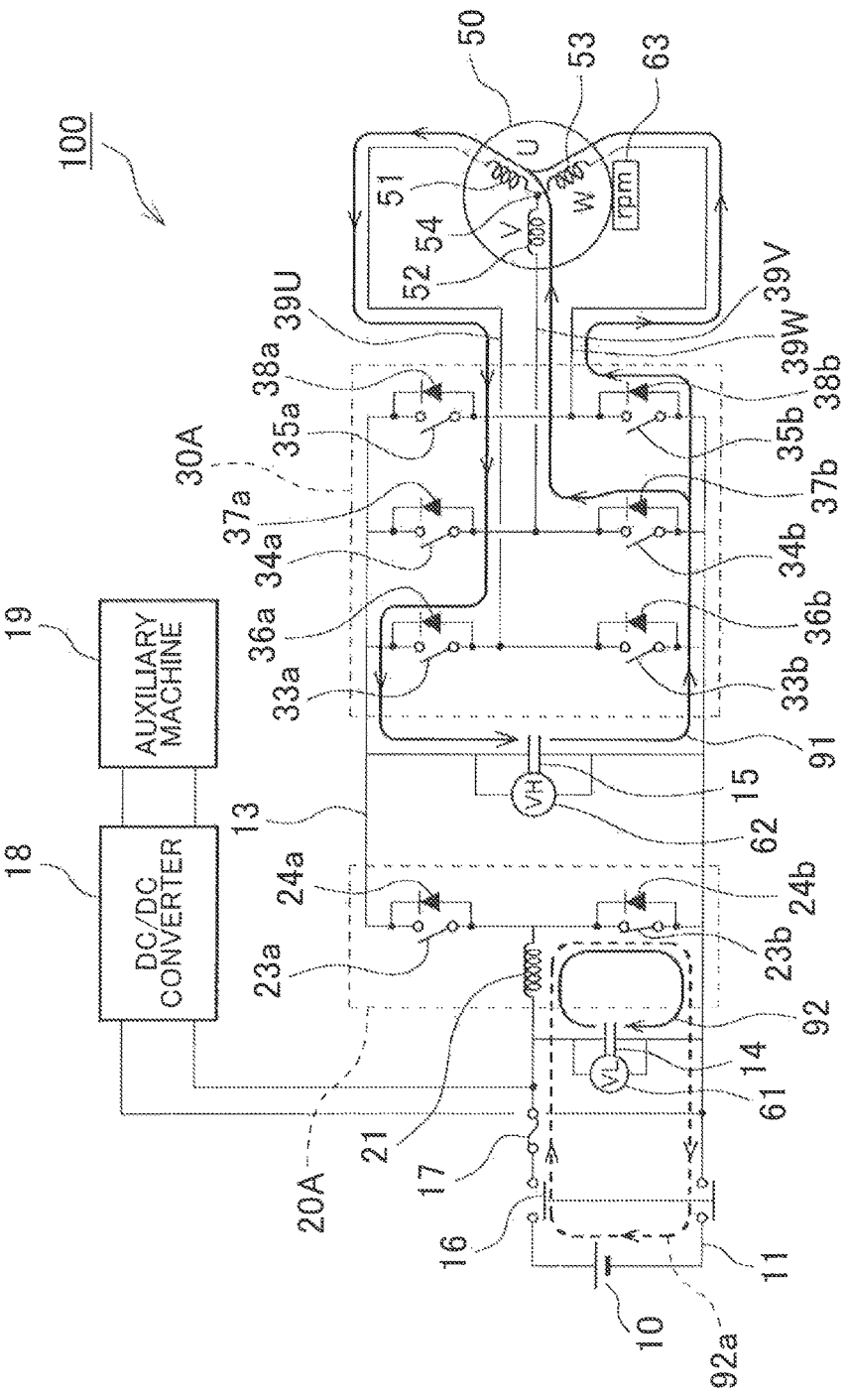
FIG. 4 is an explanatory view of the current flow in the case where a voltage step-up operation of a voltage conversion circuit is performed to detect the of state of the system main relay when secondary-side voltage of a voltage converter is equal to or lower than counter-electromotive voltage of a motor in the embodiment of the invention.

As shown in FIG. 4, the CPU 71 of the controller 70 outputs a command for turning on the lower-arm switching element 23b of the voltage step-up/step-down circuit 20A. As shown in FIG. 4, the lower-arm switching element 23b is turned on by this command. Then, as indicated by an arrow 92 in FIG. 4, a circuit that includes the primary-side smoothing capacitor 14, the reactor 21, the lower-arm switching element 23b, and the primary-side smoothing capacitor 14 is formed, and the electrical energy is accumulated in the reactor 21 by the electric charges that are reserved in the primary-side smoothing capacitor 14.

In this state, in the case where the system main relay 16 is actually off and the energization between the battery 10 and the primary-side smoothing capacitor 14 is cut off, the entire electrical energy accumulated in the reactor 21 is generated by the electrical charges that are reserved in the primary-side smoothing capacitor 14. Thus, when the electrical energy is stored in the reactor 21, the low voltage VL at both of the ends of the primary-side smoothing capacitor 14 is reduced. On the contrary, in the case where the system main relay 16 is not actually off, the battery 10 and the primary-side smoothing capacitor 14 are in energized states. Thus, as indicated by an arrow 92a that is a broken line in FIG. 4, the power of the battery 10 flows through the system main relay 16 and is accumulated in the reactor 21. For this reason, the low voltage VL at both of the ends of the primary-side smoothing capacitor 14 is hardly reduced.

Figure 5:
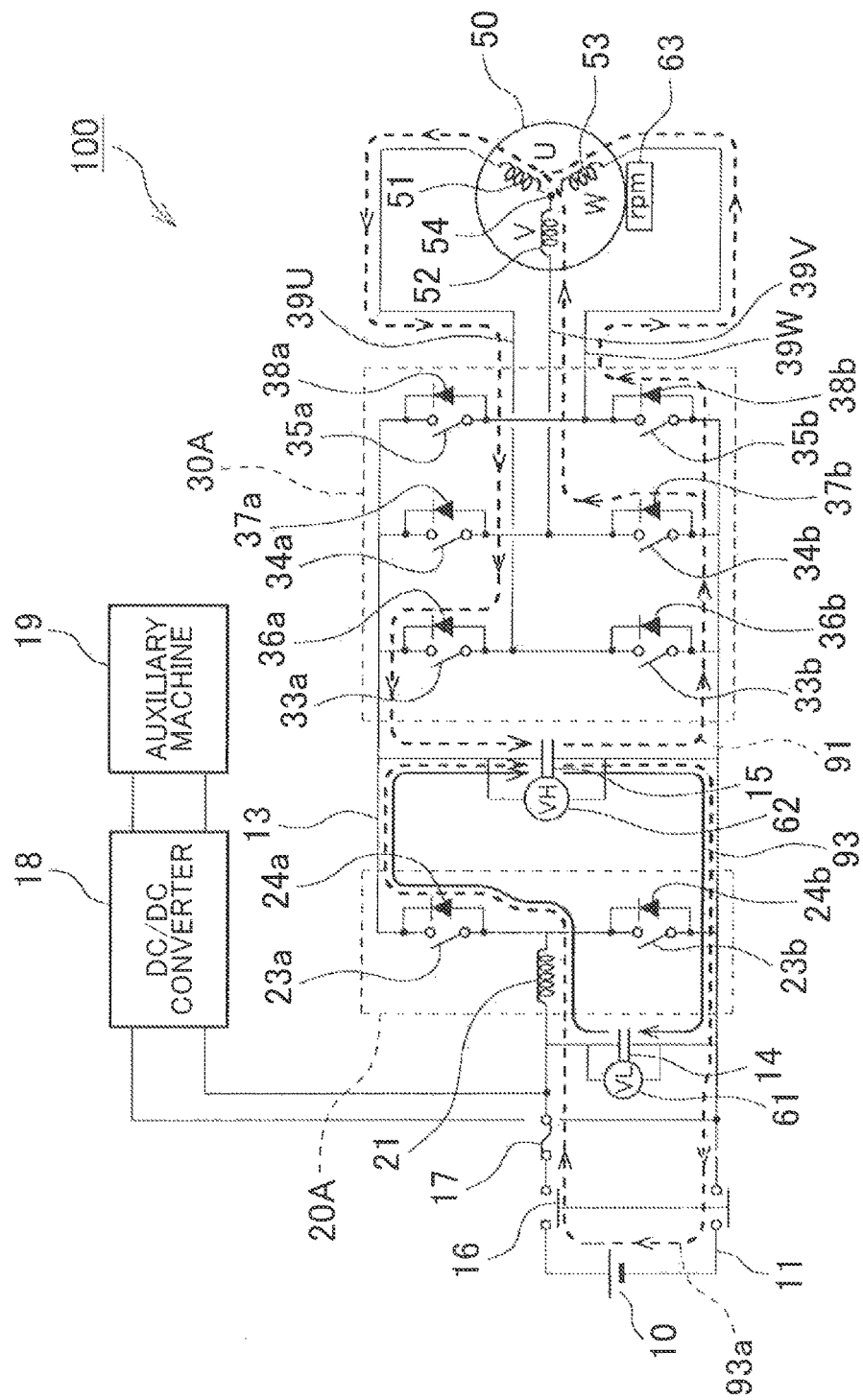
FIG. 5 is an explanatory view of the current flow in the case where the voltage step-up operation of the voltage conversion circuit is performed to detect the off state of the system main relay when the secondary-side voltage of the voltage converter is equal to or lower than the counter-electromotive voltage of the motor in the embodiment of the invention.
Figure 6:
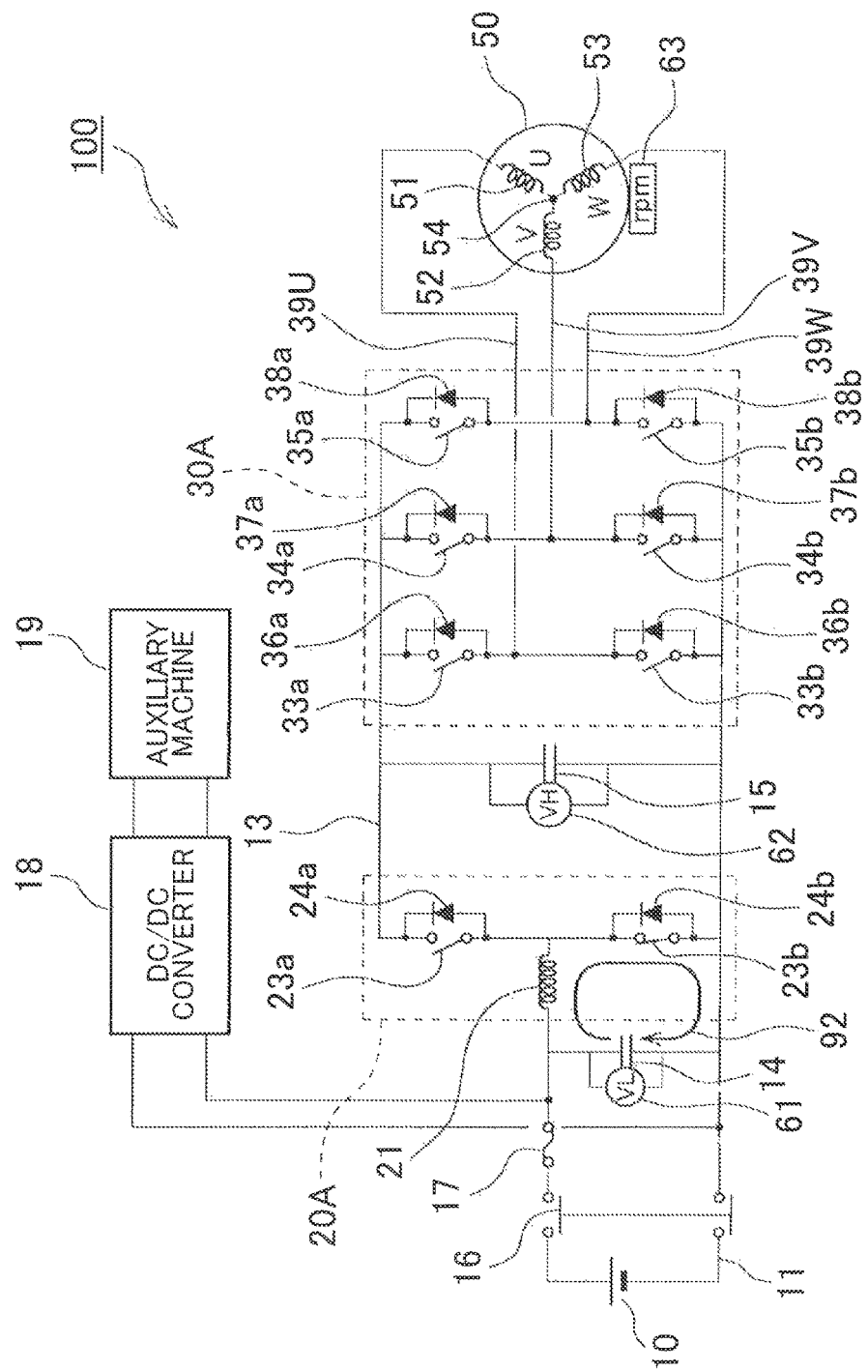
FIG. 6 is an explanatory view of the current flow in the case where the voltage step-up operation of the voltage conversion circuit is performed to detect the off state of the system main relay when the secondary-side voltage of the voltage converter is higher than the counter-electromotive voltage of the motor in the embodiment of the invention.
Figure 7:
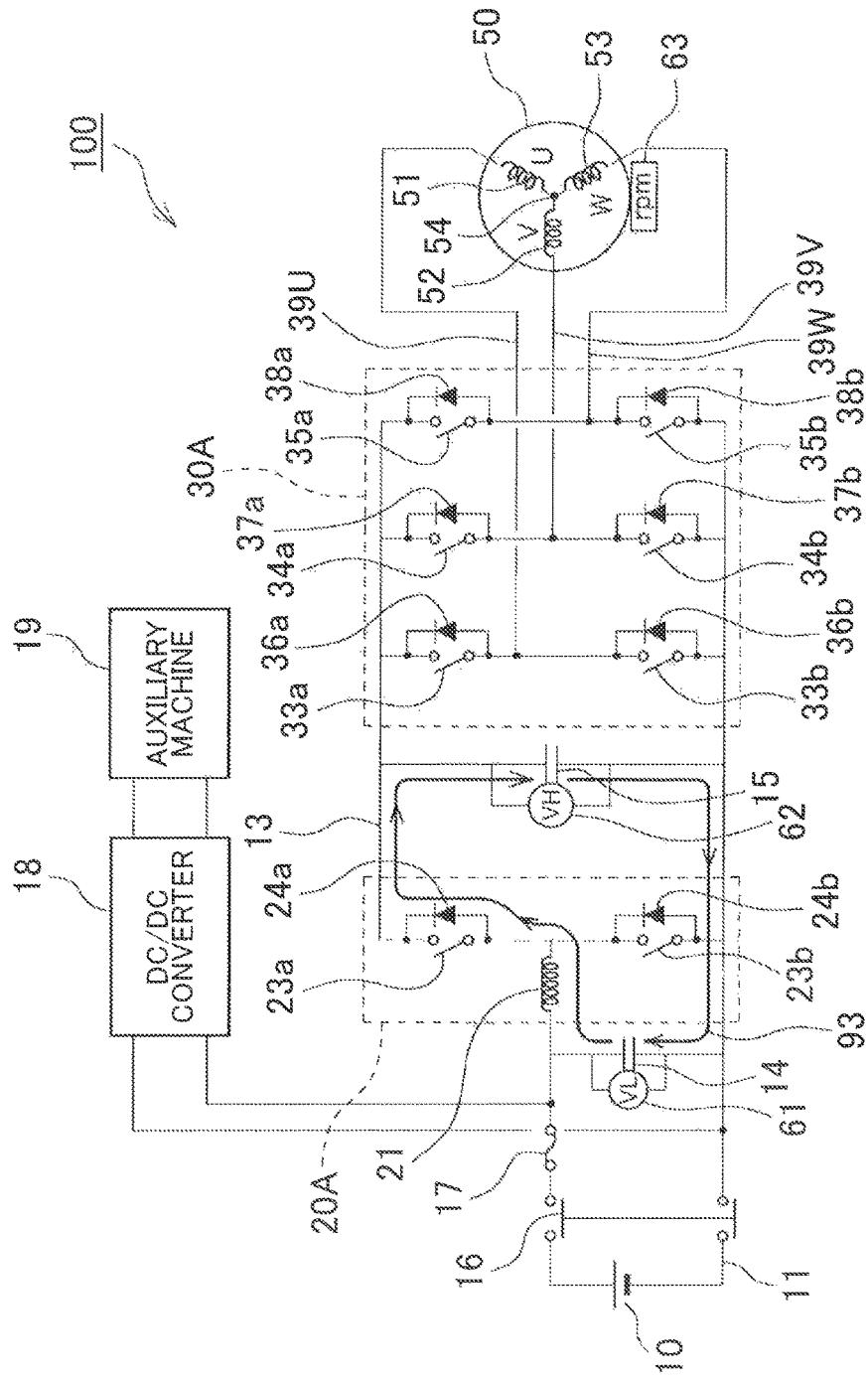
FIG. 7 is an explanatory view of the current flow in the case where the voltage step-up operation of the voltage conversion circuit is performed to detect the off state of the system main relay when the secondary-side voltage of the voltage converter is higher than the counter-electromotive voltage of the motor in the embodiment of the invention.

The CPU 71 of the controller 70 turns on the lower-arm switching element 23b of the voltage step-up/step-down circuit 20A for a specified on time period and accumulates a specified amount of the electrical energy in the reactor 21. Then, as shown in FIG. 5, the CPU 71 of the controller 70 turns off the lower-arm switching element 23b. This causes the output voltage to be stepped up by the electrical energy stored in the reactor 21, and as indicated by an arrow 93 in FIG. 5, the current flows in a circuit that includes the reactor 21, the diode 24a, the high-voltage electrical path 13, the secondary-side smoothing capacitor 15, the negative-side electrical path 11, the primary-side smoothing capacitor 14, and the reactor 21. In this way, the high voltage VH at both of the ends of the secondary-side smoothing capacitor 15 is increased to be equal to the output voltage of the voltage step-up/step-down circuit 20A. Noted that, as will be described below, the output voltage of the voltage step-up/step-down circuit 20A is controlled to be higher than the counter-electromotive voltage of the motor 50. Thus, when the lower-arm switching element 23b is turned off, the current flow between the motor 50 and the inverter 30, which is indicated by the arrow 91 in FIG. 4, is no longer present. A current path, the current flow through which is no longer present, is indicated by the arrow 91 that is the broken line in FIG. 5.

The controller 70 turns off the lower-arm switching element 23b of the voltage step-up/step-down circuit 20A for a specified off time period, then turns on the lower-arm switching element 23b again, and accumulates the electric charges of the primary-side smoothing capacitor 14 as the electrical energy in the reactor 21 again. Just as described, the controller 70 steps up the low voltage VL, which is the primary-side voltage, to the high voltage VH, which is the secondary-side voltage, by repeatedly turning on/off the lower-arm switching element 23b of the voltage step-up/step-down circuit 20A, and outputs the high voltage VH to the high-voltage electrical path 13. Accordingly, in the voltage step-up operation, the primary-side voltage of the voltage step-up/step-down circuit 20A is stepped up and output from the secondary side, and the electric charges of the primary-side smoothing capacitor 14 are moved to become the electric charges of the secondary-side smoothing capacitor 15. Thus, in the case where the voltage step-up/step-down circuit 20A performs the voltage step-up operation when the system main relay 16 is actually off, the low voltage VL at both of the ends of the primary-side smoothing capacitor 14 is reduced.

On the contrary, in the case where the system main relay 16 is not actually off (in the case of on failure), as indicated by an arrow 93a that is a broken line in FIG. 5, the current flows in a circuit that includes the reactor 21, the diode 24a, the high-voltage electrical path 13, the secondary-side smoothing capacitor 15, the negative-side electrical path 11, the battery 10, and the reactor 21, and the high voltage VH at both of the ends of the secondary-side smoothing capacitor 15 is increased to be equal to the output voltage of the voltage step-up/step-down circuit 20A. However, even when the voltage step-up/step-down circuit 20A performs the voltage step-up operation at this time, the power stored in the battery 10 simply moves as the electric charges of the secondary-side smoothing capacitor 15, and the electric charges of the primary-side smoothing capacitor 14 are hardly reduced. Thus, the low voltage VL at both of the ends of the primary-side smoothing capacitor 14 is hardly reduced.

In view of this, while causing the voltage step-up/step-down circuit 20A to perform the voltage step-up operation as shown in step S109 in FIG. 2B, the controller 70 detects the low voltage VL at both of the ends of the primary-side smoothing capacitor 14, which is the primary-side voltage of the voltage step-up/step-down circuit 20A, by using the low-voltage sensor 61 as shown in step S110 in FIG. 2B. Then, if it is determined in step S111 in FIG. 2B that the low voltage VL is reduced, the process proceeds to step S112 in FIG. 2B, and the controller 70 detects that the system main relay 16 is off. Then, as shown in step S113 in FIG. 2B, the electric charges of the primary-side smoothing capacitor 14 and the secondary-side smoothing capacitor 15 are discharged by being consumed in the auxiliary machine 19. For example, in the case where each of the respective voltages VL, VH of the smoothing capacitors 14, 15 becomes equal to or lower than specified threshold voltage, the controller 70 determines that discharging of electric charges is finished as shown in step S114 in FIG. 2B, and finishes the third system main relay off detection program 81. On the contrary, if the controller 70 determines in step S111 in FIG. 2B that the low voltage VL is not reduced, the process proceeds to step S118 in FIG. 2B, and the controller 70 detects the on failure of the system main relay 16. Then, the process proceeds to step S119 in FIG. 2B, the on failure of the system main relay 16 is displayed as a diagnosis, and the controller 70 finishes the third system main relay off detection program 81 shown in FIG. 1.

As described above with reference to FIG. 3, in the case where the high voltage VH, which is the secondary-side voltage of the voltage step-up/step-down circuit 20A, is equal to or lower than the counter-electromotive voltage of the motor 50 (the high voltage VH≤the counter-electromotive voltage), the current flows between the motor 50 and the inverter 30 as indicated by the arrow 91 in FIG. 4, and the high voltage VH is increased by the counter-electromotive voltage of the motor 50, so as to be equal to the counter-electromotive voltage of the motor 50. Accordingly, in the case where the electric charges of the primary-side smoothing capacitor 14 are moved to become the electric charges of the secondary-side smoothing capacitor 15 by the voltage step-up operation of the voltage step-up/step-down circuit 20A, it is necessary to increase the output voltage of the voltage step-up/step-down circuit 20A to become higher than the counter-electromotive voltage generated by the motor 50. The output voltage of the voltage step-up/step-down circuit 20A is determined by a ratio of the on time period of the lower-arm switching element 23b to a total time period of the on time period and the off time period, that is, a duty ratio of on/off of the lower-arm switching element 23b. When the duty ratio is increased, the step-up voltage is increased. When the duty ratio is reduced, the step-up voltage is reduced. Thus, the controller 70 controls the duty ratio of on/off of the lower-arm switching element 23b such that the output voltage of the voltage step-up/step-down circuit 20A becomes higher than the counter-electromotive voltage generated by the motor 50. For example, during the voltage step-up operation, the controller 70 may adjust the duty ratio of on/off of the lower-arm switching element 23b on the basis of the counter-electromotive voltage, which is calculated in step S105 in FIG. 2A, and the low voltage VL at both of the ends of the primary-side smoothing capacitor 14, which is detected by the low-voltage sensor 61, such that the output voltage of the voltage step-up/step-down circuit 20A becomes higher than the counter-electromotive voltage generated by the motor 50.

Next, a description will be made on the operation of the controller 70 when the controller 70 executes the first and second system main relay off detection programs 79, 80 that are shown in FIG. 1. The same operation as the operation that has been described above with reference to FIG. 3 to FIG. 5 will be described briefly.

Similar to the embodiment described above, as shown in steps S101 and S102 in FIG. 2A, the controller 70 receives the signal from the collision sensor 64 and monitors whether the electric motor vehicle 100 has collided. If it is determined in step S102 in FIG. 2A that the electric motor vehicle 100 has collided, the controller 70 stops the voltage step-up/step-down converter 20 and the inverter 30 as shown in step S103 in FIG. 2A. Then, the controller 70 detects the rotational speed of the motor 50 by the rotational speed sensor 63 as shown in step S104 in FIG. 2A, calculates the counter-electromotive voltage of the motor 50 by using the above-described (Equation 1) in step S105 in FIG. 2A, detects the high voltage VH, which is the secondary-side voltage of the voltage step-up/step-down circuit 20A, by the high-voltage sensor 62 as shown in step S106 in FIG. 2A, and compares the calculated counter-electromotive voltage with the high voltage VH. As a result, if the high voltage VH, which is the secondary-side voltage of the voltage step-up/step-down circuit 20A, is higher than the counter-electromotive voltage of the motor 50 (the high voltage VH>the counter-electromotive voltage, if "YES" in step S107 in FIG. 2B), the process proceeds to step S108 in FIG. 2B, and the controller 70 selects the voltage step-up operation (the first system main relay off detection program 79) or a voltage step-down operation (the second system main relay off detection program 80). In this case, as will be described below, the off state of the system main relay 16 can be detected regardless of whether the voltage step-up operation (the first system main relay off detection program 79) or the voltage step-down operation (the second system main relay off detection program 80) is selected. However, in the case where a difference between the detected high voltage VH and the counter-electromotive voltage is small, the voltage step-up operation (the first system main relay off detection program 79) may be selected. Alternatively, even in the case where the high voltage VH becomes equal to or lower than the counter-electromotive voltage (the high voltage VH≤the counter-electromotive voltage) for some reason during the operation, it is set that a system main relay off detection operation can be continued. In addition, in the case where the difference between the high voltage VH and the counter-electromotive voltage is so large that the high voltage VH does not become equal to or lower than the counter-electromotive voltage (the high voltage VH≤the counter-electromotive voltage), the voltage step-down operation (the second system main relay off detection program 80) may be selected. Furthermore, for a purpose of detecting the off state of the system main relay 16 in a short time period, in the case where the high voltage VH that is detected by the high-voltage sensor 62 exceeds the specified threshold, the voltage step-down operation (the second system main relay off detection program 80) may be selected. On the contrary, in the case where the high voltage VH that is detected by the high-voltage sensor 62 is equal to or lower than the specified threshold, the voltage step-up operation (the first system main relay off detection program 79) may be selected.

The following description will be made on a case where the controller 70 selects the voltage step-up operation and the CPU 71 executes the first system main relay off detection program 79 shown in FIG. 1. If the controller 70 selects the voltage step-up operation (the first system main relay off detection program 79) in step S108 in FIG. 2B (if "YES" in step S108 in FIG. 2B), the process proceeds to step S109 in FIG. 2B, and the controller 70 causes the voltage step-up/step-down circuit 20A to perform the voltage step-up operation.

As described above with reference to FIG. 4 and FIG. 5, the CPU 71 of the controller 70 steps up the voltage by repeatedly turning on/off the lower-arm switching element 23b of the voltage step-up/step-down circuit 20A. When the lower-arm switching element 23b is turned on during the voltage step-up operation, the current flows in the circuit as indicated by the arrow 92 in FIG. 6 that includes the reactor 21, the lower-arm switching element 23b, the primary-side smoothing capacitor 14, and the reactor 21, and the electrical energy is accumulated in the reactor 21. Then, when the lower-arm switching element 23b is turned off, the current flows in the circuit as indicated by the arrow 93 in FIG. 7 that includes the reactor 21, the diode 24a, the high-voltage electrical path 13, the secondary-side smoothing capacitor 15, the negative-side electrical path 11, the primary-side smoothing capacitor 14, and the reactor 21, and the high voltage VH at both of the ends of the secondary-side smoothing capacitor 15 is increased to be equal to the output voltage of the voltage step-up/step-down circuit 20A. Noted that, when the first system main relay off detection program 79 is executed, the high voltage VH, which is the secondary-side voltage of the voltage step-up/step-down circuit 20A, is higher than the counter-electromotive voltage of the motor 50. Thus, unlike the case where the third system main relay off detection program, which has been described with reference to FIG. 4 and FIG. 5, is executed, the current does not flow from the motor 50 to the inverter 30.

The controller 70 repeatedly turns on/off the lower-arm switching element 23b of the voltage step-up/step-down circuit 20A, just as described. In this way, the controller 70 steps up the low voltage VL, which is the primary-side voltage, to become the high voltage VH, which is the secondary-side voltage, outputs the high voltage VH to the high-voltage electrical path 13, and moves the electric charges of the primary-side smoothing capacitor 14 to make them become the electric charges of the secondary-side smoothing capacitor 15. Accordingly, in the case where the voltage step-up/step-down circuit 20A performs the voltage step-up operation when the system main relay 16 is actually off, the low voltage VL at both of the ends of the primary-side smoothing capacitor 14 is reduced. On the contrary, similar to the case that has been described above with reference to FIG. 5, even in the case where the voltage step-up/step-down circuit 20A performs the voltage step-up operation when the system main relay 16 is not actually off, the power stored in the battery 10 simply moves as the electric charges of the secondary-side smoothing capacitor 15. Thus, the electric charges of the primary-side smoothing capacitor 14 are not reduced, and the low voltage VL at both of the ends of the primary-side smoothing capacitor 14 is hardly reduced.

In view of the above, while the voltage step-up/step-down circuit 20A performs the voltage step-up operation as shown in step S109 in FIG. 2B, the controller 70 detects the low voltage VL at both of the ends of the primary-side smoothing capacitor 14, which is the primary-side voltage of the voltage step-up/step-down circuit 20A, by using the low-voltage sensor 61 as shown in step S110 in FIG. 2B. If it is determined in step S111 in FIG. 2B that the low voltage VL is reduced, the process proceeds to step S112 in FIG. 2B, and the controller 70 detects that the system main relay 16 is off. Then, the electric charges of the primary-side smoothing capacitor 14 and the secondary-side smoothing capacitor 15 are discharged by being consumed in the auxiliary machine 19 as shown in step S113 in FIG. 2B. When the discharging of the electric charges is finished as shown in step S114 in FIG. 2B, the controller 70 finishes the first system main relay off detection program 79. On the contrary, if it is determined in step S111 in FIG. 2B that the low voltage VL is not reduced, the process proceeds to step S118 in FIG. 2B, and the controller 70 detects the on failure of the system main relay 16. Then, the process proceeds to step S119 in FIG. 2B, the on failure of the system main relay 16 is displayed as the diagnosis, and the controller 70 finishes the first system main relay off detection program 79 shown in FIG. 1.

Next, a description will be made on a case where the controller 70 selects the voltage step-down operation and the CPU 71 executes the second system main relay of detection program 80 shown in FIG. 1. If the controller 70 does not select the voltage step-up operation but selects the voltage step-down operation (the second system main relay off detection program 80) in step S108 in FIG. 2B (if "NO" in step S108 in FIG. 2B), the process proceeds to step S115 in FIG. 2B, and the controller 70 causes the voltage step-up/step-down circuit 20A to perform the voltage step-down operation.

Figure 8:
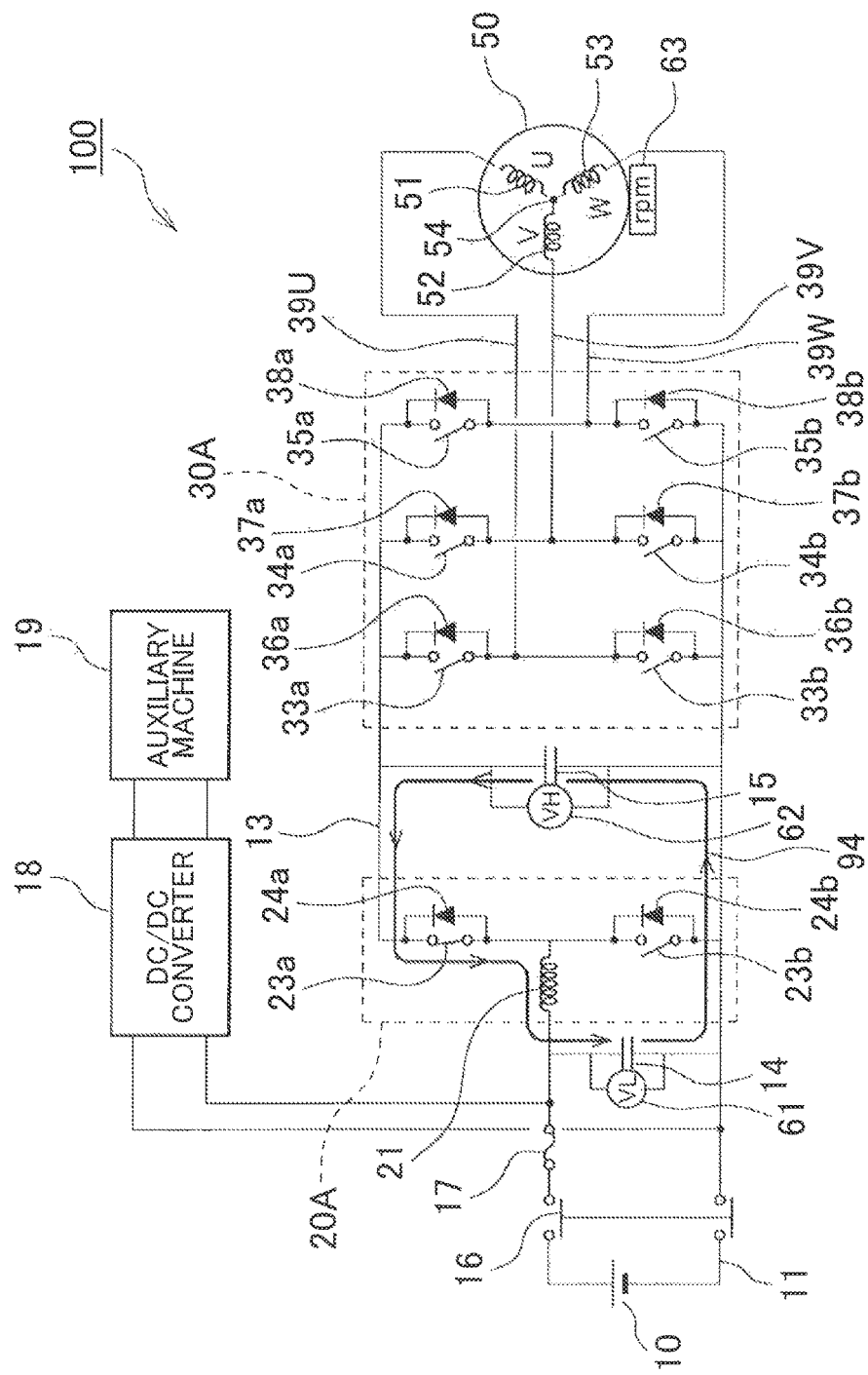
FIG. 8 is an explanatory view of the current flow in the case where a voltage step-down operation of the voltage conversion circuit is performed to detect the off state of the system main relay when the secondary-side voltage of the voltage converter is higher than the counter-electromotive voltage of the motor in the embodiment of the invention.

As shown in FIG. 8, the CPU 71 of the controller 70 outputs a command of turning on the upper arm switching element 23a of the voltage step-up/step-down circuit 20A. As shown in FIG. 8, the upper arm switching element 23a is turned on by this command. Then, as indicated by an arrow 94 in FIG. 8, a circuit that includes the secondary-side smoothing capacitor 15, the high-voltage electrical path 13, the upper arm switching element 23a, the reactor 21, the primary-side smoothing capacitor 14, the negative-side electrical path 11, and the secondary-side smoothing capacitor 15 is formed, and the electric charges of the high voltage VU of the secondary-side smoothing capacitor 15 are stepped down and accumulated as the electrical energy in the reactor 21.

Figure 9:
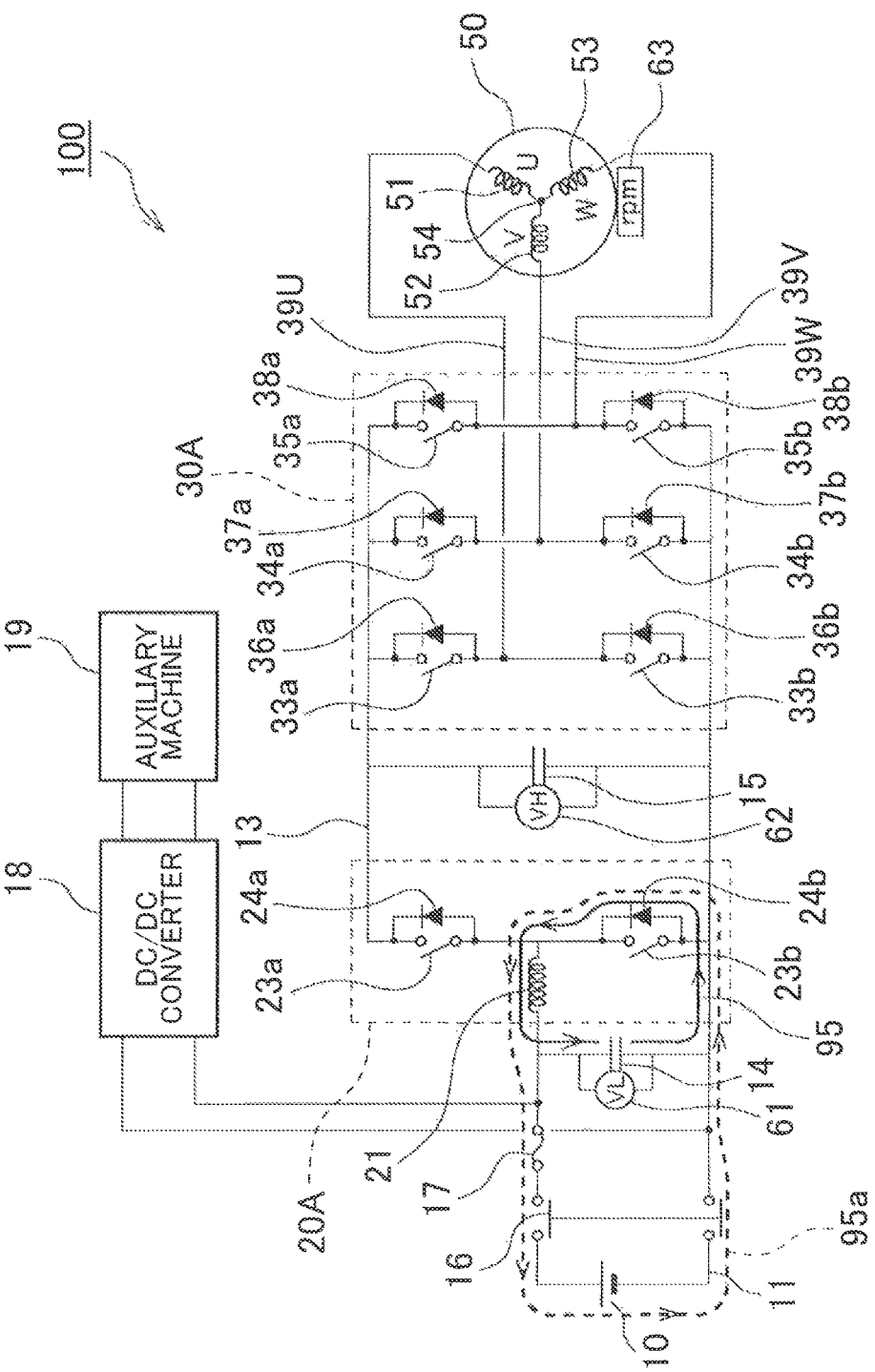
FIG. 9 is an explanatory view of the current flow in the case where the voltage step-down operation of the voltage conversion circuit is performed to detect the off state of the system main relay when the secondary-side voltage of the voltage converter is higher than the counter-electromotive voltage of the motor in the embodiment of the invention.

The CPU 71 of the controller 70 turns on the upper arm switching element 23a of the voltage step-up/step-down circuit 20A for a specified on time period and accumulates a specified amount of the electrical energy in the reactor 21. Then, as shown in FIG. 9, the CPU 71 of the controller 70 turns off the upper arm switching element 23a. This causes the current to flow in a circuit that includes the reactor 21, the primary-side smoothing capacitor 14, the diode 24b, and the reactor 21 by the electrical energy stored in the reactor 21 as indicated by an arrow 95 in FIG. 9. In this way, the low voltage VL at both of the ends of the primary-side smoothing capacitor 14 is increased during the voltage step-down operation.

The controller 70 turns off the upper arm switching element 23a of the voltage step-up/step-down circuit 20A for a specified off time period, then turns on the upper arm switching element 23a again, and accumulates the electric charges of the secondary-side smoothing capacitor 15 as the electrical energy in the reactor 21 again. Just as described, the controller 70 repeatedly turns on/off the upper arm switching element 23a of the voltage step-up/step-down circuit 20A. In this way, the controller 70 steps down the secondary-side voltage of the voltage step-up/step-down circuit 20A, outputs the secondary-side voltage of the voltage step-up/step-down circuit 20A from the primary side, and moves the electric charges of the secondary-side smoothing capacitor 15 to make them become the electric charges of the primary-side smoothing capacitor 14. Accordingly, in the case where the voltage step-up/step-down circuit 20A performs the voltage step-down operation when the system main relay 16 is actually off, the low voltage VL at both of the ends of the primary-side smoothing capacitor 14 is increased due to the moved electric charges.

Meanwhile, in the case where the system main relay 16 is not actually off (in the case of the on failure), as indicated by an arrow 95a that is a broken line in FIG. 9, the current flows in a circuit that includes the reactor 21, the battery 10, the diode 24b, and the reactor 21, and the electric charges of the secondary-side smoothing capacitor 15 move to the battery 10 by the voltage step-down operation. This simply causes the battery 10 to be charged, and the electric charges of the primary-side smoothing capacitor 14 are not increased. Thus, the low voltage VL at both of the ends of the primary-side smoothing capacitor 14 is hardly increased.

In view of the above, while the voltage step-up/step-down circuit 20A performs the voltage step-down operation as shown in step S115 in FIG. 2B, the controller 70 detects the low voltage VL at both of the ends of the primary-side smoothing capacitor 14, which is the primary-side voltage of the voltage step-up/step-down circuit 20A, by using the low-voltage sensor 61 as shown in step S116 in FIG. 2B. If it is determined in step S117 in FIG. 2B that the low voltage VL is increased, the process proceeds to step S112 in FIG. 2B, and the controller 70 detects that the system main relay 16 is off. Then, the electric charges of the primary-side smoothing capacitor 14 and the secondary-side smoothing capacitor 15 are discharged by being consumed in the auxiliary machine 19 as shown in step S113 in FIG. 2B. When the discharging of the electric charges is finished as shown in step S114 in FIG. 2B, the controller 70 finishes the second system main relay off detection program 80. On the contrary, if it is determined in step S117 in FIG. 2B that the low voltage VL is not increased, the process proceeds to step S118 in FIG. 2B, and the controller 70 detects the on failure of the system main relay 16. Then, the process proceeds to step S119 in FIG. 2B, the on failure of the system main relay 16 is displayed as the diagnosis, and the controller 70 finishes the second system main relay off detection program 80 shown in FIG. 1.

In the embodiment that has been described so far, after the electric motor vehicle 100 collides, the voltage step-up/step-down circuit 20A performs the voltage step-up operation or the voltage step-down operation. In the case where the low voltage VL at both of the ends of the primary-side smoothing capacitor 14, which is the primary-side voltage of the voltage step-up/step-down circuit 20A at the time, is reduced or increased (is changed), the off state of the system main relay 16 is detected. In the case where the low voltage VL is not changed, the on failure of the system main relay 16 is detected. Thus, the embodiment produces such an effect that the off state of the system main relay 16 can be detected regardless of presence or absence of receipt of the signal for turning off the system main relay 16.

Noted that, even in the case where the high voltage VH is equal to or lower than the counter-electromotive voltage (the high voltage VH≤the counter-electromotive voltage), the voltage step-up/step-down circuit 20A performs the voltage step-down operation as in the second system main relay off detection program 80. Then, in the case where the low voltage VL at both of the ends of the primary-side smoothing capacitor 14 is increased, the off state of the system main relay 16 can be detected. However, when the system main relay 16 is actually off, the low voltage VL keeps increasing until the rotation of the motor 50 becomes zero, and this possibly causes damage on low-pressure side components. For this reason, in the case where the low voltage VL is increased to the specified threshold voltage, for example, the voltage step-down operation may be stopped and switched to the voltage step-up operation. At this time, the off state of the system main relay 16 may be detected due to a reduction in the low voltage VL. In addition, in the case where the voltage step-down operation is performed when the system main relay 16 is not actually off (in the case of the on failure), the high voltage VH is repeatedly increased and reduced, and the operation is not possibly stabilized. Accordingly, in the case where a fluctuation range of the detected high voltage VH that is detected by the high voltage sensor 62 is more extensive than that of the specified threshold, the on failure of the system main relay 16 may be detected. Alternatively, similar to what has been described above, the voltage step-down operation may be stopped and switched to the voltage step-up operation, and the off state of the system main relay 16 may be detected due to the reduction in the low voltage VL at the time.

The invention is not limited to the each embodiment that has been described so far, but includes all modifications and changes that do not depart from the technical scope or the nature of the invention defined by the claims. For example, in the each embodiment, the description has been made in which the ECU 82 that differs from the controller 70 receives the signal of the collision sensor 64 during the collision of the electric motor vehicle 100 and outputs the signal for turning off the system main relay 16 and in which the signal is also input to the controller 70. However, a configuration in which the controller 70 receives the signal of the collision sensor 64 and outputs the signal for turning off the system main relay 16 may be adopted.

What is claimed is:

1. An electric motor vehicle comprising:
   a voltage conversion circuit;
   a primary-side smoothing capacitor connected to a primary side of the voltage conversion circuit;
   a battery connected in parallel to the primary-side smoothing capacitor on the primary side of the voltage conversion circuit;
   a system main relay connected between the primary-side smoothing capacitor and the battery;
   a secondary-side smoothing capacitor connected to a secondary side of the voltage conversion circuit;
   an inverter circuit connected in parallel to the secondary-side smoothing capacitor on the secondary side of the voltage conversion circuit;
   an electric motor connected to the inverter circuit;
   a first voltage sensor configured to detect primary-side voltage of the voltage conversion circuit;
   a collision sensor configured to detect a collision of the electric motor vehicle;
   a second voltage sensor configured to detect secondary-side voltage of the voltage conversion circuit;
   a rotational speed sensor configured to detect a rotational speed of the electric motor, wherein the voltage conversion circuit is configured to output a step up voltage of the primary-side voltage from the secondary side and output a step down voltage of the secondary-side voltage from the primary side; and
   a controller configured to:
      (a) adjust an operation of the voltage conversion circuit;
      (b) detect the primary-side voltage by using the first voltage sensor in a state that the voltage conversion circuit is operated in a case where the collision is detected by the collision sensor;
      (c) detect a state that the system main relay is off based on a change in the detected primary-side voltage;
      (d) calculate counter-electromotive voltage of the electric motor on the basis of the rotational speed of the electric motor that is detected by the rotational speed sensor;
      (e) detect the primary-side voltage by using the first voltage sensor in a state that the voltage conversion circuit outputs the step up voltage in a case where the secondary-side voltage detected by the second voltage sensor is higher than the counter-electromotive voltage of the electric motor; and
      (f) detect the state that the system main relay is off based on a decrease of the detected primary-side voltage.

2. The electric motor vehicle according to claim 1, wherein the controller is configured to:
   (g) calculate counter-electromotive voltage of the electric motor on the basis of the rotational speed of the electric motor that is detected by the rotational speed sensor,
   (h) detect the primary-side voltage by using the first voltage sensor in a state that the voltage conversion circuit outputs the step down voltage in the case where the secondary-side voltage detected by the second voltage sensor is higher than the counter-electromotive voltage of the electric motor, and
   (i) detect that the state that the system main relay is off based on an increase of the detected primary-side voltage.

3. The electric motor vehicle according to claim 1, wherein the controller is configured to:
   (g) calculate the counter-electromotive voltage of the electric motor on the basis of the rotational speed of the electric motor that is detected by the rotational speed sensor;
   (h) detect the primary-side voltage by using the first voltage sensor in the state that the voltage conversion circuit outputs the step up voltage in the case where the secondary-side voltage detected by the second voltage sensor is equal to or lower than the counter-electromotive voltage of the electric motor; and
   (i) detect the state that the system main relay is off based on the decrease of the detected primary-side voltage.

4. The electric motor vehicle according to claim 2, wherein
   the controller is configured to:
      (g) calculate the counter-electromotive voltage of the electric motor on the basis of the rotational speed of the electric motor that is detected by the rotational speed sensor;
      (h) detect the primary-side voltage by using the first voltage sensor in the state that the voltage conversion circuit outputs the step up voltage in the case where the secondary-side voltage detected by the second voltage sensor is equal to or lower than the counter-electromotive voltage of the electric motor; and
      (i) detect the state that the system main relay is off based on the decrease of the detected primary-side voltage.

5. An electric motor vehicle comprising:
   a voltage conversion circuit;

a primary-side smoothing capacitor connected to a primary side of the voltage conversion circuit;

a battery connected in parallel to the primary-side smoothing capacitor on the primary side of the voltage conversion circuit;

a system main relay connected between the primary-side smoothing capacitor and the battery;

a secondary-side smoothing capacitor connected to a secondary side of the voltage conversion circuit;

an inverter circuit connected in parallel to the secondary-side smoothing capacitor on the secondary side of the voltage conversion circuit;

an electric motor connected to the inverter circuit;

a first voltage sensor configured to detect primary-side voltage of the voltage conversion circuit;

a collision sensor configured to detect a collision of the electric motor vehicle;

a second voltage sensor configured to detect secondary-side voltage of the voltage conversion circuit;

a rotational speed sensor configured to detect a rotational speed of the electric motor, wherein the voltage conversion circuit is configured to output a step up voltage of the primary-side voltage from the secondary side and output a step down voltage of the secondary-side voltage from the primary side; and a controller configured to:
  (a) adjust an operation of the voltage conversion circuit;
  (b) detect the primary-side voltage by using the first voltage sensor in a state that the voltage conversion circuit is operated in a case where the collision is detected by the collision sensor;
  (c) detect a state that the system main relay is off based on a change in the detected primary-side voltage;
  (d) calculate counter-electromotive voltage of the electric motor on the basis of the rotational speed of the electric motor that is detected by the rotational speed sensor;
  (e) detect the primary-side voltage by using the first voltage sensor in a state that the voltage conversion circuit outputs the step down voltage in the case where the secondary-side voltage detected by the second voltage sensor is higher than the counter-electromotive voltage of the electric motor; and
  (f) detect that the state that the system main relay is off based on an increase of the detected primary-side voltage.

6. The electric motor vehicle according to claim 5, wherein the controller is configured to:
  (g) calculate the counter-electromotive voltage of the electric motor on the basis of the rotational speed of the electric motor that is detected by the rotational speed sensor;
  (h) detect the primary-side voltage by using the first voltage sensor in a state that the voltage conversion circuit outputs the step up voltage in a case where the secondary-side voltage detected by the second voltage sensor is equal to or lower than the counter-electromotive voltage of the electric motor; and
  (i) detect the state that the system main relay is off based on a decrease of the detected primary-side voltage.

7. The electric motor vehicle according to claim 5, wherein the controller is configured to:
  (g) calculate the counter-electromotive voltage of the electric motor on the basis of the rotational speed of the electric motor that is detected by the rotational speed sensor;
  (h) detect the primary-side voltage by using the first voltage sensor in a state that the voltage conversion circuit outputs the step up voltage in the case where the secondary-side voltage detected by the second voltage sensor is higher than the counter-electromotive voltage of the electric motor; and
  (i) detect the state that the system main relay is off based on a decrease of the detected primary-side voltage.

8. The electric motor vehicle according to claim 7, wherein the controller is configured to:
  (j) calculate the counter-electromotive voltage of the electric motor on the basis of the rotational speed of the electric motor that is detected by the rotational speed sensor;
  (k) detect the primary-side voltage by using the first voltage'sensor in the state that the voltage conversion circuit outputs the step up voltage in a case where the secondary-side voltage detected by the second voltage sensor is equal to or lower than the counter-electromotive voltage of the electric motor; and
  (l) detect the state that the system main relay is off based on the decrease of the detected primary-side voltage.

* * * * *